Figure 1:
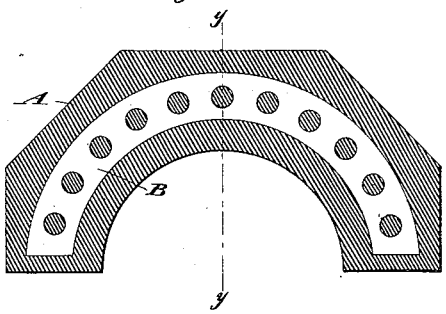

(No Model.)

J. DE S. BROWN.
SELF LUBRICATING COMPOSITION.

No. 453,961. Patented June 9, 1891.

Witnesses:
Charles R. Searle,
H. J. Johnstone.

Inventor:
James de S. Brown
by his attorney
Thomas Drew Stetson

UNITED STATES PATENT OFFICE.

JAMES DE SELDING BROWN, OF PHILADELPHIA, PENNSYLVANIA.

SELF-LUBRICATING COMPOSITION.

SPECIFICATION forming part of Letters Patent No. 453,961, dated June 9, 1891.

Application filed March 3, 1891. Serial No. 383,626. (No model.)

*To all whom it may concern:*

Be it known that I, JAMES DE SELDING BROWN, a citizen of the United States, residing in the city and county of Philadelphia, in the State of Pennsylvania, have invented a certain new and useful Self-Lubricating Composition or Material and Bearings Made Therefrom, suitable for line-shaft bearings, axle-boxes, slides, and other parts of machinery where it is desirable to avoid or overcome friction, of which tl following is a specification.

I have devised a mate al which gives surfaces nearly frictionless, ee from a disposition to cut, and possessii the property of expanding when cooling ai. contracting when heating, making almost impossible the "binding" under heat common in ordinary metals. This material is of such tenacity and weight that it can be made a practicable substitute for phosphor-bronze, Babbitt metal, or other material used for the purposes named, and has the additional advantage of performing its own lubrication, rendering unnecessary the application of any o; the lubricants ordinarily required.

The material may be shaped by tools, and thus any thickness or form of a bearing may be produced from a la, :er block; but I prefer, when any large number is required, to produce a mold and follower in the proper form to reduce each in the act of molding to nearly or quite the form and size required.

I melt refined Trinidad asphaltum in a kettle or other vessel with a small quantity of gum-camphor and stir in peroxide of lead. I afterward add and mix as thoroughly as possible liberal quantities of graphite in its ordinary flaky condition until the mass is brought to a thick condition, like dough. Ordinarily seventy-five pounds of asphaltum and three pounds of gum-camphor with ten pounds of peroxide of lead will take about one hundred pounds of graphite.

I will first describe the simpler form of the invention. Having a suitable mold and follower with facilities for giving a strong pressure by a screw-press, and having heated the mold to about the same temperature as the mixture—270° Fahrenheit—I nearly fill the mold with the hot pasty composition, apply the pressure at from one thousand to twenty thousand pounds per square inch, according to the work the bearing has to perform, and hold it compressed until its temperature has lowered to about 100° Fahrenheit, after which the pressure may be relaxed and the article taken from the mold and allowed to finish its cooling in the open air.

I will now describe what I esteem the best mode of carrying out the invention. To make this better adapted for heavy work, I re-enforce the material, as described, with alternate layers or disks of perforated rawhide, using the term "disk" to indicate a piece of rawhide cut to the proper shape, placing in the bottom of the mold a perforated disk of rawhide, on top or above this placing about one-half inch of the material, then another disk and more material, and so on until the mold is filled. The whole is then compressed and cooled, as described.

The accompanying drawings form a part of this specification and represent sections of a railroad-car-axle box.

Figure 2:
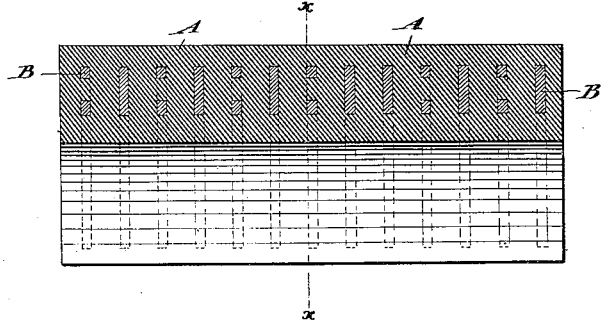

Figure 1 is a vertical transverse section on the line $x$ $x$ in Fig. 2. Fig. 2 is a vertical longitudinal section on the line $y$ $y$ in Fig. 1.

Referring to the drawings and to the letters of reference thereon, A is the composition, and B the layers of perforated rawhide.

It is of advantage with either mode of carrying out the invention to thoroughly mix about twenty-five pounds of finely-ground or flower sulphur with the composition and to place the material, after molding and compression, in an air-tight cylinder, with a hand-hole or man-hole with a cover for access to the interior, and with the necessary steam-pipes or other efficient means to generate the required heat. When the material is placed therein, the cylinder is strongly and tightly closed and atmospheric air is forced in with an air-pump to a sufficient pressure to prevent the volatilizing of the compound at vulcanizing temperature, 300° to 400° Fahrenheit. The compound is held for several hours, after which it is removed from the cylinder and allowed to cool. The compound can be vulcanized by confining in sealed or closed molds of sufficient strength and placing in an oven or kiln at ordinary air-pressure; but I prefer an air-pressure of one hundred to one hundred and fifty pounds per square inch, under which the mold may be employed or not, as preferred.

It is important that the composition be as homogeneous in its constituents as possible.

Modifications may be made. Where the end-thrust is great, in place of asphalt I can substitute as much or more of india-rubber and gutta-percha, either separately or combined, with peroxide of lead, graphite, and sulphur, added as described, the compound thus made being then molded, compressed, and vulcanized, as specified.

If instead of using Trinidad asphaltum I use other asphalt, as Neufchatel, or any of the other bitumens, as coal-tar or the pitch resulting from the distillation of petroleum, nearly the same result can be obtained; or I can mingle two or more of these various kinds of bitumen.

I claim as my invention—

1. The material or compound described, composed of bitumen, gum-camphor, peroxide of lead, and graphite intimately mixed and united under pressure at a high temperature, substantially as herein described.

2. The material described, composed of bitumen, gum-camphor, peroxide of lead, and graphite with sulphur, all intimately mixed and held under pressure at a high temperature and vulcanized, substantially as herein described.

3. A bearing containing asphalt or analogous bitumen and sulphur with graphite intimately mingled, molded into shape, and vulcanized by exposure to heat under pressure, substantially as herein specified.

4. The bearing described, composed of bitumen, gum-camphor, peroxide of lead, graphite, and sulphur, all intimately mixed, bound together, and re-enforced with rawhide, compressed at a high temperature, and vulcanized, substantially as herein described.

In testimony that I claim the invention above set forth I affix my signature in presence of two witnesses.

JAMES DE SELDING BROWN.

Witnesses:
CHARLES R. SEARLE,
M. F. BOYLE.